United States Patent [19]

Lehnert

[11] 3,983,450
[45] Sept. 28, 1976

[54] LOW LEVEL PINCUSHION CORRECTION SYSTEM WITH A DUAL IMPEDANCE YOKE

[75] Inventor: Stanley E. Lehnert, Addison, Ill.

[73] Assignee: Zenith Radio Corporation, Chicago, Ill.

[22] Filed: Feb. 26, 1975

[21] Appl. No.: 553,343

[52] U.S. Cl. .............................................. 315/370
[51] Int. Cl.² ........................................ H01J 29/56
[58] Field of Search ........................... 315/370, 371

[56] References Cited
UNITED STATES PATENTS 3,894,268  7/1975  Reh et al. ........................... 315/371
3,934,173  1/1976  Korver ................................. 315/408

OTHER PUBLICATIONS

*Active Corrections of EW & NS Cushions in 110° Colour TV*, P. Guigou, Onde Elec., vol. 51, Fasc. 3, pp. 204–208, Mar. 71.

Primary Examiner—Richard A. Farley
Assistant Examiner—T. M. Blum
Attorney, Agent, or Firm—Roy Ekstrand

[57] ABSTRACT

A television receiver includes conventional circuitry for detecting the information components of a received television signal. A cathode ray tube viewing screen is scanned by horizontal and vertical scanning circuitry. Low level pincushion correction circuitry imposes a bow-tie signal upon the vertical scan signal forming a composite signal. A series connected vertical yoke has a first terminal coupled to a vertical deflection amplifier and a second terminal connected to ground. The composite signal applied produces vertical scan and pincushion correction currents in the yoke. A tank circuit, resonant at the horizontal scan frequency, is interposed between the vertical yoke windings and a pair of shunting capacitors are connected in parallel with each of the yoke windings and the tank circuit to reduce yoke impedance to the pincushion correction components of the composite signal.

7 Claims, 5 Drawing Figures

LOW LEVEL PINCUSHION CORRECTION SYSTEM WITH A DUAL IMPEDANCE YOKE

BACKGROUND OF THE INVENTION

This invention relates in general to scanned display systems and in particular to those utilizing cathode ray tubes such as television receivers.

Among the geometric distortions produced when a beam emanating from a theoretical point source is caused, by synchronous deflection along two axes, to scan a viewing screen having a radius of curvature greater than the center screen-to-point source distance, is pincushion. Pincushion is readily observable when information in the form of a graticule is displayed, appearing as a "bowing in" of the reproduced image. If the viewing screen has a greater radius of curvature along both axes (as is the case in present day television receivers), pincushion results along both axes, that is, along horizontal and vertical lines. The former is called "top and bottom" pincushion and the latter "side" pincushion. Quite obviously pincushion distortion is maximized when the radius of the screen curvature is infinite (i.e., flat screen), and while cathode ray tubes generally do not have flat screens, aesthetic considerations usually dictate that nearly flat screens be used.

Of particular interest in the present invention is the top and bottom pincushion or "vertical sag" as it is often called. Analysis of the scanning process typically used in cathode ray display systems shows that a high frequency horizontal deflection system causes side-to-side scanning of the viewing screen while a lower frequency vertical deflection system causes successive side-to-side scans to progress in a downward direction.

It is well known that correction of top and bottom pincushion distortion may be accomplished by adding an appropriate horizontal frequency deflection component to the normal vertical deflection signal. It is also well known that top and bottom pincushion is zero for the mid-screen horizontal scan line and increases progressively (i.e., greater sagging) with increased vertical deflection angle. As a result, the correction signal is required to vary in amplitude from a maximum at one polarity, corresponding to horizontal scan lines at the top of the viewing screen through zero, corresponding to those at mid-screen, to a maximum at the opposite polarity corresponding to the bottom of the screen. In addition to the amplitude variations described, the horizontal rate signal should, for ideal correction, be of such character that its effect upon the vertical deflection is the complement of the distortion. Such a waveform is quite complex and difficult to fabricate and general practice is to approximate the ideal correction in the form of either a cosine, parabolic, or sine squared waveform.

Top and bottom pincushion compensation systems may be categorized as being either high level or low level, the former characterized by direct yoke current correction and the latter by addition of a correction signal to the vertical deflection amplifier. High level correction uses a saturable reactor in series with the vertical deflection yoke. Horizontal rate signals are applied to balanced inputs of the reactor, to which is also applied a sample of the vertical deflection signal. The reactor is wound such that the amplitude and polarity of the induced horizontal component coupled to the vertical deflection yoke is determined by the instantaneous polarity and amplitude of the applied vertical signal.

With the increased deflection current required by lower impedance yokes such as those having toroidal wound coils, the saturable reactor, which must carry the entire vertical scanning current, becomes a prohibitively large, wasteful and expensive device and a very inefficient mechanism for correcting pincushion distortion. As a result the alternative low level systems are currently enjoying increased attention from display system manufacturers.

As mentioned, a low level correction system differs from the above-described high level system in that the appropriate correction waveform is produced by specialized receiver circuitry at a relatively small amplitude and applied to an appropriate point in the vertical deflection amplifier configuration rather than directly to the "high power" yoke. The low level signal generated comprises horizontal frequency sine-wave signals having an envelope defining a first maximum amplitude at the beginning of vertical scan, a linearly decreasing-to-zero amplitude at mid-scan followed by a linearly increasing-to-a-second-maximum amplitude at the end of vertical scan, giving the waveform envelope a bow-tie shape.

One simple method of generating this "bow-tie" signal is described in application Ser. No. 520,837 filed Nov. 4, 1974 in the name of Stanley Lehnert and assigned to the assignee of the present invention in which a full wave rectified vertical scan signal is serrated by horizontal sweep retrace signals to form a train of pulses. A resonant tank circuit is stimulated by the pulse train to produce the "bow-tie" waveform.

Regardless of the means used to generate the bow-tie signal, low level systems place an additional burden on the vertical deflection amplifier by the imposition of the correction signal upon the vertical scan signal. The problem is made more acute by the fact that the vertical yoke has inductive reactance and, therefore, presents a substantially increased impedance to the higher frequency correction components than to the vertical scan signals. The different impedances of the vertical yoke for vertical scanning and horizontal rate correction signals means that even small pincushion currents require disproportionately large voltage swings by the vertical deflection amplifier. For example, a typical vertical deflection yoke, having series connected windings, requires approximately 10 volts of vertical scan signal to produce 1 ampere of deflection current. The same yoke requires approximately 80 volts of horizontal frequency correction signal to produce the typically desired 35 milliamperes of pincushion correction current.

In contemporary television receiver design, the vertical deflection amplifier is "transistorized" and the supply voltage, as well as the type of output transistors used, are subject to stringent cost limitations. This means that typical vertical deflection amplifiers, while adequate to fulfill receiver scan requirements, require a substantial increase in operating voltages and more expensive output devices to accommodate the increased voltage swing produced by the imposed correction signal.

The costs associated with vertical amplifier changes have militated against low level pincushion correction systems. The present invention overcomes this limitation of prior art systems.

3

OBJECT OF THE INVENTION

Accordingly, it is an object of the present invention to provide an improved cost-effective low level pin-cushion correction system.

SUMMARY OF THE INVENTION

Deflection means, within a display system having a scanned viewing screen of geometry such that pincushion distortion is introduced during scanning, are responsive to low frequency scanning signals and include a pair of inductive impedances which are effectively in series for low frequency components of a locally generated pincushion distortion compensation signal, and in parallel for high frequency components thereof.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
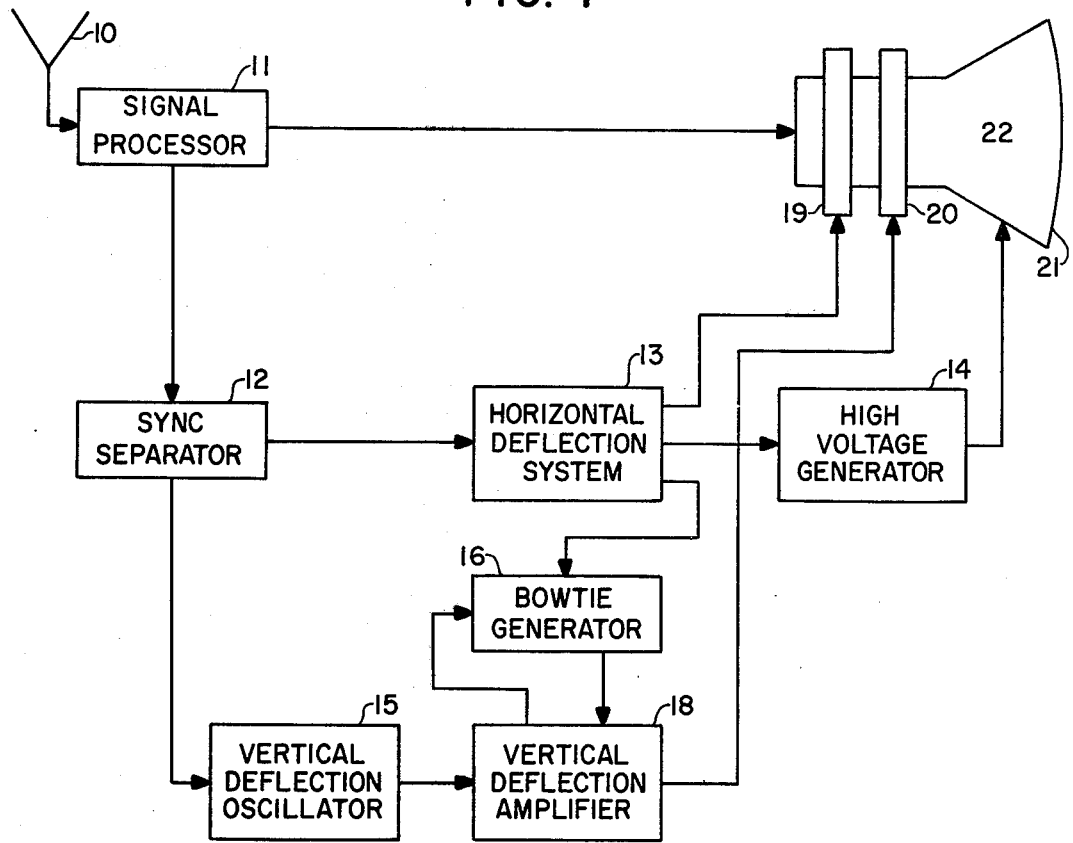
FIG. 1 is a block diagram representation of a television receiver constructed in accordance with the present invention.

In FIG. 1 a television signal, bearing modulation components of picture information together with deflection synchronization signals, incident on an antenna 10 is supplied to a signal processor 11. Signal processor 11 includes conventional circuitry to detect and amplify the modulation components and is coupled to the control electrodes (not shown) of a cathode ray tube 22 and to a sync separator 12. The amplified picture information intensity modulates the CRT electron beams impinging on a viewing screen 21.

The demodulated output of signal processor 11, including both picture and deflection synchronization components, is coupled to sync separator 12 which separates the deflection synchronization components from the picture information. The output of sync separator 12 is coupled to a horizontal deflection system 13 and a vertical deflection oscillator 15. The output of horizontal deflection system 13, which comprises a horizontal rate scanning signal, is applied to a horizontal deflection yoke 19, for electromagnetically deflecting the CRT electron beams to produce horizontal scanning of screen 21, and to a high voltage generator 14. The latter produces a high voltage electron accelerating potential for application to cathode ray tube 22.

Vertical deflection oscillator 15 produces a vertical frequency signal which is coupled to a vertical deflection amplifier 18 which, in turn, drives a vertical deflection yoke 20. Yoke 20 includes configuring means to be explained below. The outputs of horizontal deflection system 13 and vertical deflection amplifier 18 are also applied to a low level bow-tie generator 16, the output of which is applied to vertical deflection amplifier 18.

With the exception of vertical deflection yoke 20, the elements and operation of the receiver shown in FIG. 1 are the same as those of conventional receivers employing low level pin-cushion correction schemes. Horizontal yoke 19 and vertical yoke 20 are indicated separately for clarity. It will, however, be understood that both are generally separate windings on a common magnetic core.

As mentioned earlier, the radius of curvature of viewing screen 21 is substantially greater than the distance from the screen center to the deflection center of the cathode ray tube (which approximates a theoretical electron point source). This geometric relationship results in pincushion distortion in the displayed image unless compensatory currents are introduced into the yokes. Since both screen curvature radii are greater than the screen center to deflection center distance, both "top and bottom" and "side" pincushion distortion result. However, the discussions which follow only concern "top and bottom" or vertical correction.

Figure 2:
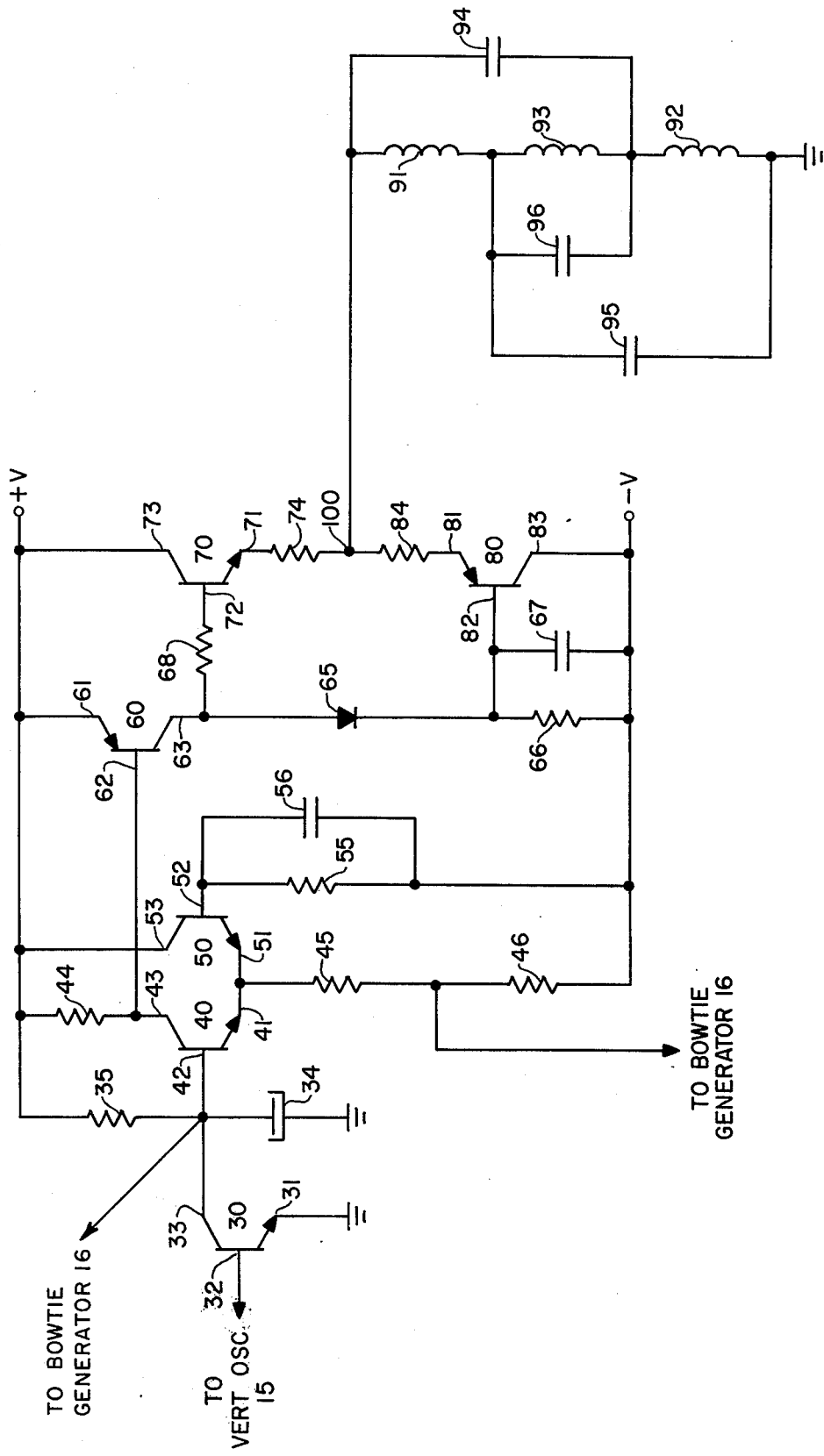
FIG. 2 is a detailed schematic diagram of a portion of the receiver shown in FIG. 1.

FIG. 2 shows vertical deflection amplifier 18 and vertical deflection yoke 20 in schematic detail. A switch transistor 30 has an emitter 31 connected to ground, a base 32 coupled to vertical oscillator 15 and a collector 33 coupled to +V by a resistor 35. A sawforming capacitor 34 couples collector 33 to ground. A differential amplifier is formed by a first differential transistor 40 having an emitter 41, a base 42 connected to the junction of collector 33 and capacitor 24 and a collector 43 coupled to +V by a load resistor 44 and a second differential transistor 50 having an emitter 51 connected to emitter 41, a base 52 coupled to −V by a parallel combination of a resistor 55 and a capacitor 56, and a collector 53 connected to +V. Emitters 41 and 51 are coupled to −V by a series combination of resistors 45 and 46. The junction of these resistors is coupled to bow-tie generator 16. A driver transistor 60 has an emitter 61 connected to +V, a base 62 connected to collector 43 of transistor 40 and a collector 63. Collector 63 is connected to a resistor 68 and the anode of a diode 65.

An NPN output transistor 70, having an emitter 71, a base 72 connected to resistor 68 and a collector 73 connected to +V, together with a PNP output transistor 80, having an emitter 81 coupled to emitter 71 by a series combination of resistors 84 and 74, a base 82 connected to the cathode of diode 65 and a collector 83 connected to −V, form a complementary pair output amplifier stage. The junction of base 82 and diode 65 is coupled to −V by a parallel combination of a resistor 66 and a capacitor 67. The junction of resistors 74 and 84 form an output terminal 100.

Vertical deflection yoke 20 includes a pair of conventional vertical deflection coils 91 and 92 and configuring means comprising a resonant tank circuit consisting of a capacitor 96 and inductor 93 (connected in series with coils 91 and 92) and a pair of capacitors 94 and 95. Shunt capacitor 94 couples the junction of deflection coil 92 and inductance 93 to output terminal 100. Shunt capacitor 95 couples the junction of deflection coil 91 and inductance 93 to ground. The other ends of deflection coils 91 and 92 are connected to terminal 100 and ground.

A better understanding of the present invention may be obtained by initially considering the operation of vertical deflection amplifier 18 with just a scan signal, then its operation with a combined scan and bow-tie signal (composite signal) and finally examining the vertical deflection yoke response to the composite signal.

In operation, the signal developed by oscillator 15 is applied to the base of switch transistor 30. At the beginning of vertical scan transistor 30 is turned off and capacitor 34 charged from +V through resistor 35. As capacitor 34 is charged, a positive-going ramp voltage is developed across it which is applied to the base of transistor 40, increasing its conduction. The increased conduction produces a negative-going ramp voltage at collector 43, which is applied to the base of transistor 60 causing a positive-going ramp at its collector 63. The ramp voltage at collector 63 is the drive input for the complementary pair output stage, formed by transistors 70 and 80, which amplifies the power of the applied signal in a well known manner to drive the vertical deflection yoke. The ramp voltage continues to increase during the scan portion of the vertical deflection cycle after which oscillator 15 initiates retrace by driving switch transistor 30 into heavy conduction, quickly discharging capacitor 34 and rapidly decreasing the voltage on base 42. This decrease in voltage increases the voltage at collector 43, decreases the voltage at bases 72 and 82 which results in a decrease in voltage applied to the vertical deflection yoke windings 91 and 92. This cycle is repeated in response to the vertical oscillator resulting in the familiar "saw-tooth" scan waveform.

In considering operation of vertical deflection amplifier 18 which the addition of the pincushion correction voltage, it should be understood that the above-described scan generation continues to occur. The output of generator 16, which comprises the well known bow-tie signal, is applied to the junction of resistors 45 and 46. The differential amplifier formed by transistors 40 and 50, responds to both the input scan signal and the bow-tie signal and imposes a bow-tie waveform upon the vertical scan signal produced at collector 43 of transistor 40. As described above, this composite signal is coupled via transistors 60, 70 and 80 to deflection yoke 20. Since vertical amplifier 18 and its operation is representative of conventional low level pincushion correction systems, it should be understood that the discussions below are relevant to most vertical deflection amplifiers.

Vertical deflection coils 91 and 92 are essentially connected in series because the interposed tank circuit, comprising coil 93 and capacitor 96, presents a low impedance (ideally a short circuit) to signals at the vertical scan frequency. However, the tank circuit presents a high impedance (ideally an open circuit) to signals at the horizontal scan frequency. Capacitors 94 and 95 are selected to have high impedance for signals at the vertical scan frequency and low impedance for signals at the horizontal scan frequency.

Figure 3A:
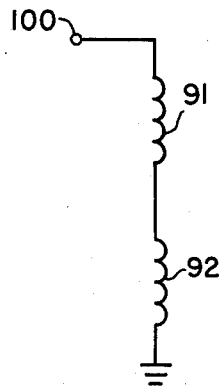
FIGS. 3A and 3B are equivalent circuit representations of portions of the circuit in FIG. 2.
Figure 3B:
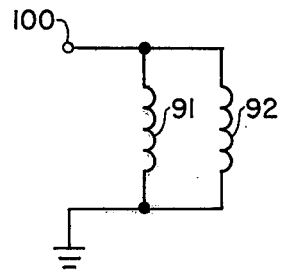

The total effective impedance of the combination of yoke 20 and configuring means 25 is complex and the analysis may be simplified by using equivalent circuits for the high and low frequency components of the composite signal. The equivalent circuit or load represented by deflection yoke 20 and configuring means 25 for vertical scan signals is shown in FIG. 3A and the equivalent circuit for horizontal frequency pincushion components is shown in FIG. 3B. Examination of FIG. 3A indicates that the network impedance for vertical scan signals is simply the series combination of vertical deflection coils 91 and 92. Similarly, examination of FIG. 3B shows the network impedance for pincushion correction signals at the horizontal scan frequency is the parallel combination of deflection coils 91 and 92. Thus the vertical yoke impedance for signal components of horizontal scan frequency is one-fourth its impedance for vertical scan signals. Since the voltage to produce a given current through equal parallel impedances is one-half that for the series configuration of those same impedances, with the present invention only one-half the previously required drive voltage is needed.

Figure 4B:
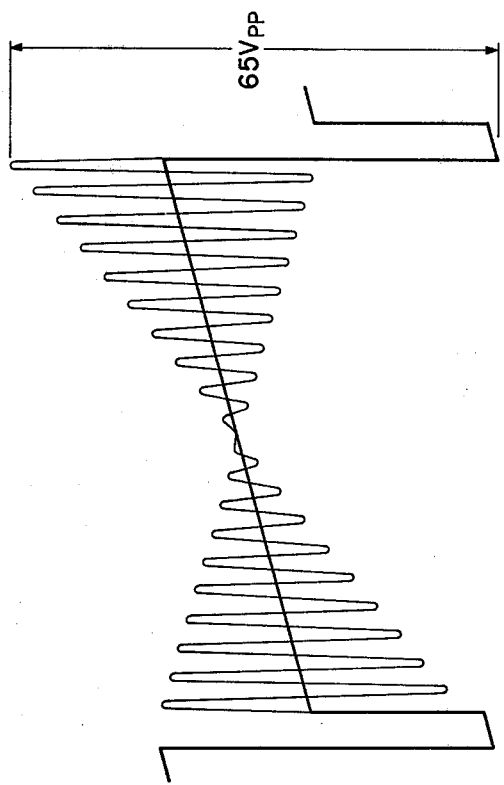
FIG. 4A and 4B are composite vertical scan output signals of the vertical deflection amplifier.
Figure 4A:
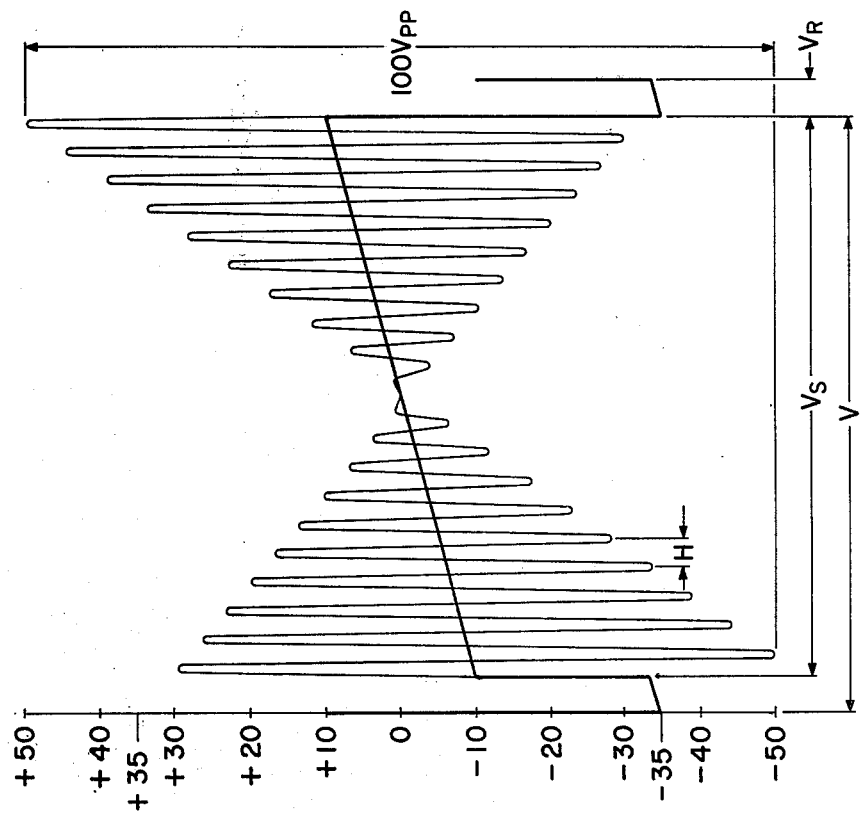

FIG. 4A shows the vertical deflection amplifier output signal with a conventional series yoke and FIG. 4B the output signal for the yoke and configuring means of the present invention (assuming identical vertical deflection coils, supplied with equal scan and pincushion correction currents). The output waveforms are the sum of the bow-tie waveform and the vertical scan signal. The vertical scan signal comprises an increasing ramp voltage interval ($V_s$) followed by a negative-going retrace pulse interval ($V_r$). The bow-tie signal comprises a succession of horizontal scan frequency sinusoidal signals of period H. Due to the much greater impedance of the inductive yoke to higher frequency pincushion signals, they appear disproportionately large with respect to scan signals. However, it must be kept in mind that the waveforms shown indicate voltage applied and that the scan currents produced in the yoke are much greater than pincushion correction currents.

It should be noted that in both figures, the signal requirements of the vertical deflection amplifier for vertical scan purposes are the same, that is, extremes of +10 and −35 or 45 volts total swing produce yoke currents of approximately 1 ampere. This is consistent with the equivalent circuit (FIG. 3A) which indicates that the load presented for vertical scan signals is not substantially affected by the configuring means of the present invention. The figures show clearly, however, that the horizontal rate bow-tie voltage required to produce approximately 35 milliamperes of correction current in the system of the present invention is one-half that required for the conventional system. This is also consistent with the equivalent circuit (FIG. 3B) which indicates that the deflection coils are, for horizontal frequency signals, effectively in parallel. Thus for identical correction currents the vertical deflection amplifier in the conventional system requires a signal swing capability of 100 volts peak to peak whereas with the invention only 65 volts peak to peak is required.

The additional voltage capability required by the conventional system is attained with transistors operable at higher voltages, which are considerably more expensive than their lower operating voltage counterparts. Therefore, considerable economic benefit is achieved with the present invention in a low level pincushion correction system.

What has been shown is a novel means of realizing the advantages of a low level pincushion correction system which does not prohibitively increase the signal handling capability requirements of the deflection amplifier.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. Display means, including a scannable viewing screen having geometry such that pincushion distortion is introduced during scanning comprising:

high frequency scanning means producing high frequency scanning signals for scanning said viewing screen in a first direction;

low frequency scanning means producing low frequency scanning signals for scanning said viewing screen in a second direction;

waveforming means, coupled to said high and low frequency scanning means, producing a pincushion distortion compensation signal having both high and low frequency components;

deflection means, responsive to said low frequency scanning signals, including first and second inductive impedances; and means configuring said first and second inductive impedances serially for said low frequency components of said pincushion distortion compensation signal, and parallelly for said high frequency components of said pincushion distortion compensation signal.

2. Display means as set forth in claim 1, wherein said means configuring include:

first and second shunt impedances, having substantially greater impedance for said low frequency components than for said high frequency components, coupled to said first and second inductive impedances, respectively.

3. Display means as set forth in claim 2, wherein said first and second inductive impedances each include input and common leads and wherein said means configuring include:

isolating means, serially interposed between said common leads of first and second inductive impedances, having a substantially greater impedance for said high frequency components than for said low frequency components.

4. Display means as set forth in claim 3, wherein said first shunt impedance is coupled between said common lead of said first inductive impedance and said input lead of said second inductive impedance and wherein said second shunt impedance is coupled between said common lead of said second inductive impedance and said input lead of said first inductive impedance.

5. Display means as set forth in claim 4, wherein said first and second shunt impedances are capacitors.

6. Display means as set forth in claim 5, wherein said isolating means include:

a tank circuit having a parallel resonance at a frequency approximately equal to that of said high frequency components.

7. For use in a television receiver in which a pincushion correction signal is generated at a low level and added to the vertical scan signal to compensate for pincushion distortion caused by the geometry of the receiver cathode ray tube display device, a deflection yoke comprising:

first and second vertical deflection windings; and means configuring said first and second windings in series for signals at the vertical deflection frequency and in parallel for signals at the horizontal deflection frequency.

* * * * *